United States Patent [19]

Carbert

[11] 4,157,736

[45] Jun. 12, 1979

[54] OVERLOAD PROTECTION APPARATUS FOR HYDRAULIC MULTI-FUNCTION EQUIPMENT

[76] Inventor: Ralph E. Carbert, 3401 Yukon Ave. S., Minneapolis, Minn. 55426

[21] Appl. No.: 868,699

[22] Filed: Jan. 11, 1978

[51] Int. Cl.[2] .......................... B23Q 5/00; F15B 11/00

[52] U.S. Cl. .......................................... 173/11; 91/518; 212/39 MS

[58] Field of Search ............... 91/170 R, 412; 60/711, 60/718, 719; 173/2, 11; 212/39 MS; 214/674, 764

[56] References Cited

U.S. PATENT DOCUMENTS

| | | | |
|---|---|---|---|
| 3,476,017 | 11/1969 | Frisk et al. | 91/412 |
| 3,690,387 | 9/1972 | Dixon | 173/43 |
| 3,768,372 | 10/1973 | McMillen | 91/412 |
| 3,922,954 | 12/1975 | Gustafsson et al. | 91/412 |
| 3,942,413 | 3/1976 | Schwary et al. | 91/412 |
| 3,963,127 | 6/1976 | Eriksson | 212/39 MS X |

FOREIGN PATENT DOCUMENTS

| | | | |
|---|---|---|---|
| 2030382 | 12/1971 | Fed. Rep. of Germany | 91/412 |
| 231395 | 4/1969 | U.S.S.R. | 91/412 |
| 507514 | 4/1976 | U.S.S.R. | 212/39 MS |

*Primary Examiner*—Lawrence J. Staab

*Attorney, Agent, or Firm*—Schroeder, Siegfried, Ryan, Vidas & Steffey

[57] ABSTRACT

This invention relates to an overload protection apparatus for hydraulic multi-function equipment. It is applicable to equipment sharing a common pressure and return line and in which functional operation of the equipment is interrelated such as to expose certain elements to overpressure conditions. The system includes an overload or overstress valve having a manifold to which the power lines of all of the actuators, except the principal actuator which responds to an overstress condition, are connected. These connections are directed through check valves so that fluid within the lines will be directed only to the overstress valve. A pilot valve connected to the power side of the principal cylinder controls a pressure actuated control valve in the manifold to control and open a passage to the reservoir. Thus, an overpressure condition representing an overstress to the equipment in the principal actuator will operate the pilot valve to unload the pressure lines of the associated actuators, thereby preventing their continued operation so long as the overstressed condition continues. This may be relieved by the operator reversing the operation of the motor causing the overstress condition.

9 Claims, 4 Drawing Figures

OVERLOAD PROTECTION APPARATUS FOR HYDRAULIC MULTI-FUNCTION EQUIPMENT

FIELD AND BACKGROUND OF INVENTION

My invention relates to an improved overload protection apparatus for hydraulic multi-function equipment which senses overpressure conditions in a fluid system and interrupts equipment usage until an unsafe condition is corrected.

The present invention is directed to hydraulic systems particularly used on utility type trucks such as derrick diggers or the like. Such equipment usually incorporates a single hydraulic pump and several units of operating equipment such as a winch, a digger, an extension cylinder and a lift cylinder, each controlled by an open center control valve adapting the units for bidirectional operation. The control valves are normally teed off of a common manifold and share a common return to a tank or reservoir.

The hazard associated with equipment of this type is the occurrence of an overpressure condition in the boom cylinder which can seriously damage the derrick or boom of the unit. Such an overstress condition occurs when the boom is overloaded from using either a winch on a larger than rated load at given orientation or extending the extension cylinder beyond limits while fully loaded or operating the auger in a too soft soil condition with the boom extended. Under any of these situations a normal lift cylinder pressure may be exceeded, causing boom damage and hydraulic equipment failure. Attempts to control the overpressure condition by putting a relief valve on a holding valve for the particular unit is not a satisfactory solution since it can cause a loss of holding power, sacrifice equipment operation and create an additional operator safety concern.

SUMMARY OF INVENTION

The overload protection apparatus for multi-function hydraulic equipment consists of a sensing valve and an overload relief valve working in a unique conjunction with one or more pressure load lines for the motors of the equipment such as would be employed on a utility truck, crane or the like.

The overload or overstress protection device of the improved apparatus is a unit having a common manifold and a piloted valve to couple the manifold to the reservoir or return line of the hydraulic system. All of the pressure load lines of the motor units, with the exception of the principal sensing motor, are teed to the common manifold through check valves which prevent the hydraulic fluid from feeding from one circuit into another through the manifold. The manifold includes a normally closed piloted dump spool valve which is spring loaded to a closed position. Presence of an overpressure condition is monitored through the use of a pilot line which will sense the overstress condition with a particular motor or cylinder. When this cylinder is overloaded, a pilot valve is exposed to this pressure and operates to control the pressure actuator dump spool valve in the system to unload the manifold and hence the pressure load lines of the remaining actuators. As the pilot valve operates, it releases pressure behind the piloted valve and the pressure differential causes an unbalance on the spool to move the same. This dumps the operating pressure lines to the reservoir and interrupts equipment operation until the load pressure on the principal motor or cylinder is reduced to a normal pressure. The return to normal pressure is achieved by eliminating the cause of the overpressure condition, that is, by reversing the other motor which is causing the overload until the cause of the overpressure condition is removed.

For safety purposes, the pilot line is a very small diameter line so that hydraulic fluid in the principal cylinder will not be rapidly depleted with resulting physical danger and damage. The pumping system normally has a capacity sufficient to overcome any such loss.

The improved overload or overstress valve is suitable for application where any fluid operating equipment shares pressure or return lines. Under such conditions, the functional operation of such equipment is interrelated and certain elements may be exposed to overpressure conditions when one of the units, such as the lift cylinder is already at maximum load and another unit is actuated further, thereby exceeding the maximum safe load on the lift cylinder. With such circumstances, the overload protection valve can protect against damage caused by the overstress condition by interrupting operation of the equipment without hazard to the operator or damage to the equipment.

DESCRIPTION OF THE PREFERRED EMBODIMENT

Figure 1:
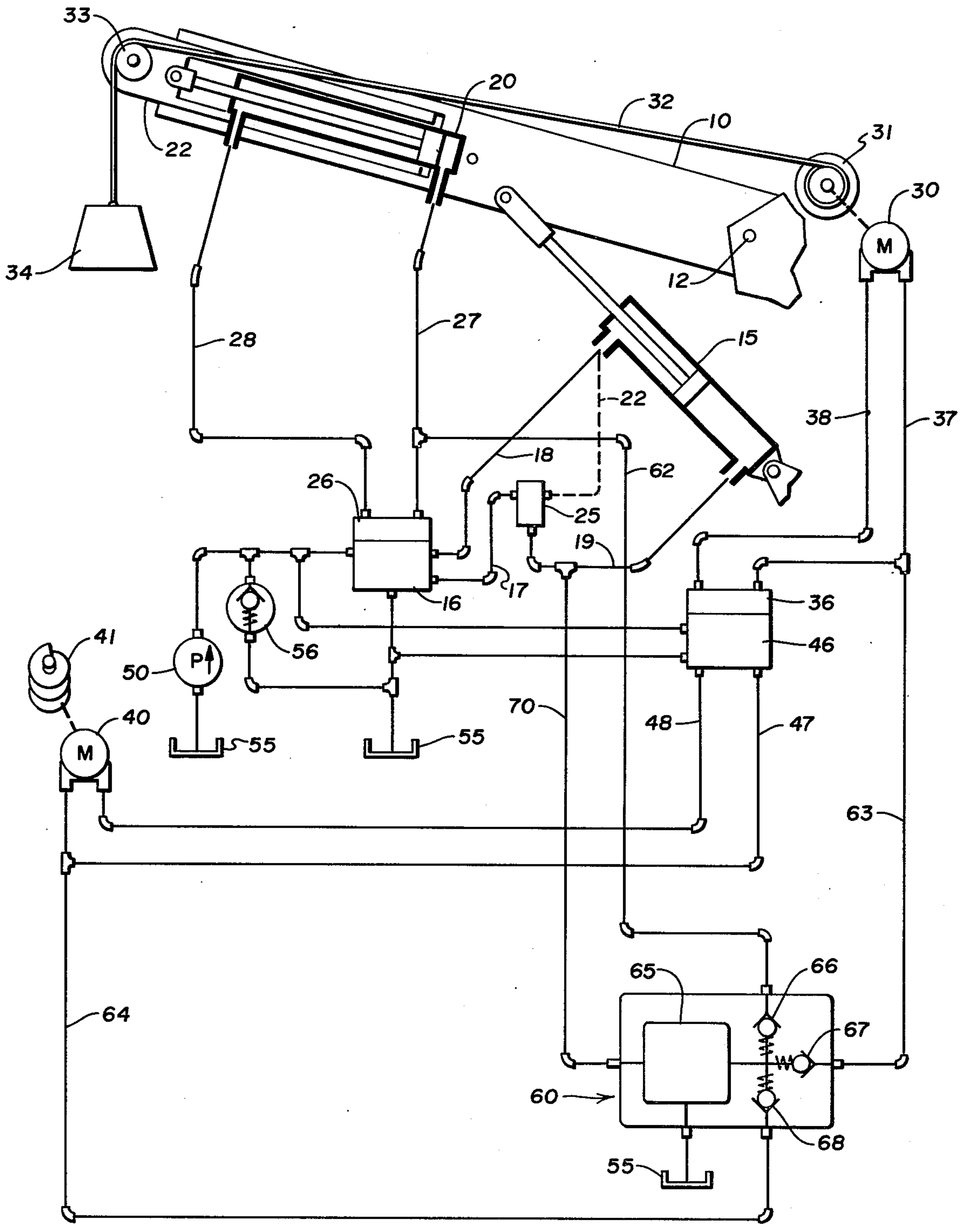
FIG. 1 is a schematic circuit diagram with a hydraulic circuit for a multi-function, interrelated equipment supplied from a common pressure source.

My improved overload protection apparatus or overstress valve is shown schematically in FIG. 1 as applied to a digger derrick type equipment normally mounted on utility trucks. It will be recognized, however, that any multi-function hydraulic equipment, such as cranes, tilt bed trucks, or trailers, or the like, may utilize the same. Such equipment has in common a single hydraulic pressure source and reservoir which may include one or more pumps operated by a common motor from a reservoir, and an interrelationship of functions so that an overload condition in one may additionally stress another which is already at its maximum load. Thus, in FIG. 1, a boom is shown schematically at 10 which is pivotally mounted on a pivot 12 and pivoted by a motive device, such as a lift cylinder, indicated at 15. The boom normally includes an extension section 22 which is actuated through an extension motor or cylinder indicated at 20. Associated with the boom is a powered winch, indicated generally at 31, which is schematically shown in association with a rotary hydraulic motor 30 operating through cabling 32 over pulleys 33 for lifting structures such as poles or weight 34. Also associated with equipment of this type is a digger 41, indicated schematically, and powered by a rotary hydraulic motor 40 connected to the auger or digger and mounted on the boom. All of the actuators are bidirectional, whether rotary or linear.

it is possible with equipment of this type that circumstances may arise which can seriously damage the derrick or boom due to an overpressure condition developing on the main lift cylinder 15. This overpressure condition can occur to overload the boom as a direct result of causing the winch to lift too heavy a load, that is, beyond its rated capacity for boom length and extension. It can also occur by operating the auger or digger in too soft a soil condition with the boom extended to its full load capacity for conditions under which the soil is harder. Under such circumstances, a resulting excessive stress is placed on the boom and the lift cylinder which supports the same causing an overpressure condition. If this condition is not corrected, it may cause boom damage or hydraulic equipment failure.

Shown schematically in the drawing is a pump, indicated at 50, which has associated therewith a reservoir 55 containing the hydraulic fluid moved by the pump through the control valves, to be later identified, to the actuators for operating the same. The pump includes a normal pressure relief valve indicated at 56 schematically.

The respective motors 15, 20, 30 and 40 are controlled by four way or open center control valves, indicated in block at 16, 26, 36 and 46 respectively. They are mounted on common manifold and receive hydraulic fluid under pressure from the pump and are connected to a return passage to the reservoir 55.

The output of the four way valves are connected to opposite ends or sides of the actuators for bidirectional operation of the same. Thus, the valve 16 is connected through forward pressure line 17 and reverse line 18 to opposite ends of the lift cylinder 15. Lift pressure line 17 is connected through a hold valve 25 which has an outlet passage line 19 connected to the end of the lift cylinder 15. The hold valve 25 is a pressure operated check valve which readily permits flow therethrough from the pump toward the lift end but is unseated or controlled by a pressure line 22 from the retract end of the lift cylinder.

The extension cylinder 20 is connected through the outlet ports of the control valve 26 to extension and retraction pressure lines 27, 28 respectively for bi-directional operation of the cylinder.

Similarly, the winch motor 30 is connected from its control valve 36 through a forward pressure line 37 and reverse line 38 for rotation of the rotary hydraulic motor, indicated at 30.

The digger is operated by rotary motor 40 which is connected with the control valve 46 through fluid line 47, and reverse line 48 for bidirectional operation thereof.

The extension cylinder 20 and the winch 31 conventionally have holding devices associated therewith to maintain these motors in a fixed position for safety purposes when forward pressure is removed from the respective motors. Thus, cylinder 20 will normally have hold valves in its pressure lines, and winch 31 will have a mechanically operated pressure release safety brake included therewith. These devices require that the fluid power to the motors be reversed to reverse operation of the respective motors. They are omitted herein for simplicity.

An overload condition in either the winch or the digger, as previously identified, will result in an overstress condition of the boom and reflect in an over-pressure condition in the lift cylinder 15. To protect against the results of such a condition, the power pressure lines which cause the winch to rotate in a lift direction or the digger auger to rotate in a dig direction, and the extension cylinder to extend, are each connected to an overload protection device, indicated generally at 60. Thus, pressure lines 27, 37 and 47 are connected through lines 62, 63, and 64 respectively to the manifold 65 of the overload protection device 60 through check valves indicated at 66, 67 and 68. The pressure line 19 for the lift cylinder is also connected in controlling relation, by means of a small pilot line 70, to a pilot valve 80 at the control input side of the overload protection device, as will be hereinafter described.

Figure 2:
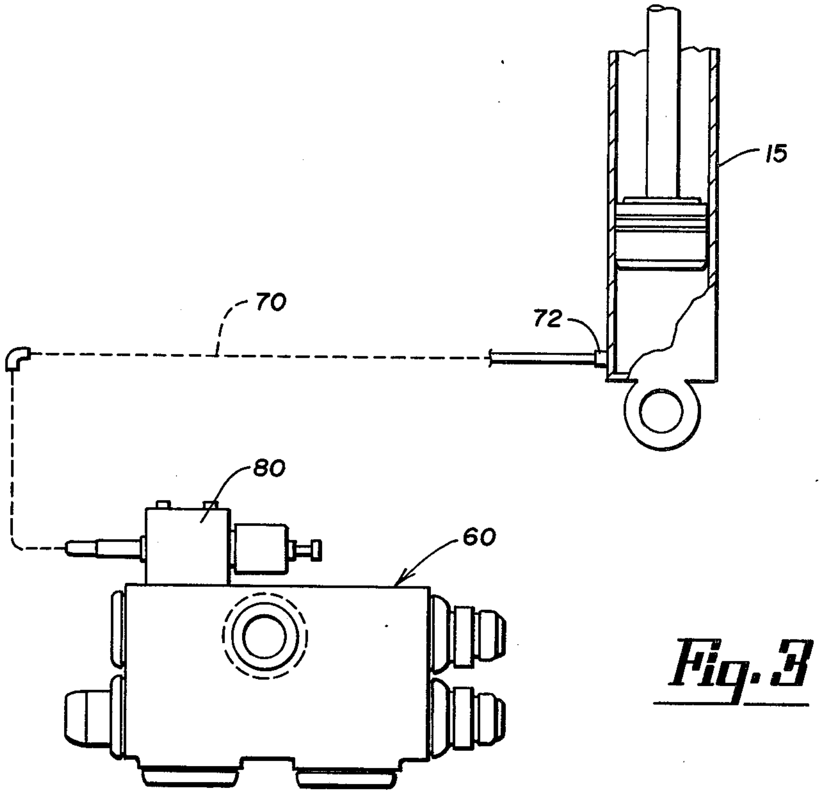
FIG. 2 is an elevational view of the overload protection device piloted from a single load cylinder.
Figure 3:
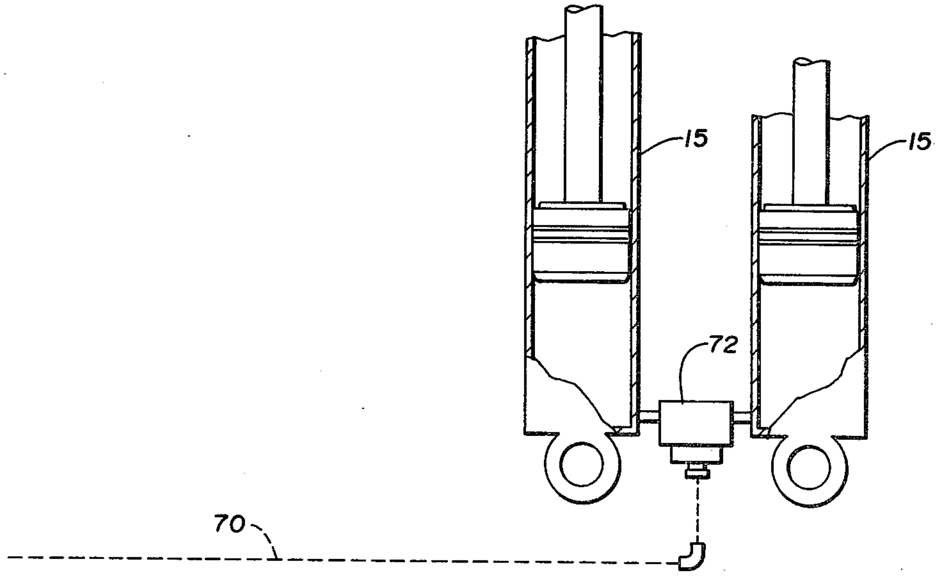
FIG. 3 is a fragmentary elevational view similar to FIG. 2 for a twin cylinder; and, FIG. 4 is an elevational view in section of the overload protection device showing the interrelation of parts thereof.

In FIGS. 2 and 3, it will be seen that a lift cylinder may be a single cylinder or a twin cylinder actuator with the pilot line 70 being connected to the pilot or sensing valve 80 mounted on and integral with the overload protection device 60. The pilot line, although shown schematically as connected to the output of the holding valve 25, is actually connected to the cylinder or cylinders independent of power line 19. The pilot line is a very small diameter line with an orifice fitting 72 at its connection to the actuator so that fluid flow therethrough, in the event of breakage of the pilot line, will not be such as to permit a dumping operation of the lift cylinder. The pump 50 normally has a capacity sufficient to hold the lift cylinder in its extended position despite such leakage condition.

Figure 4:
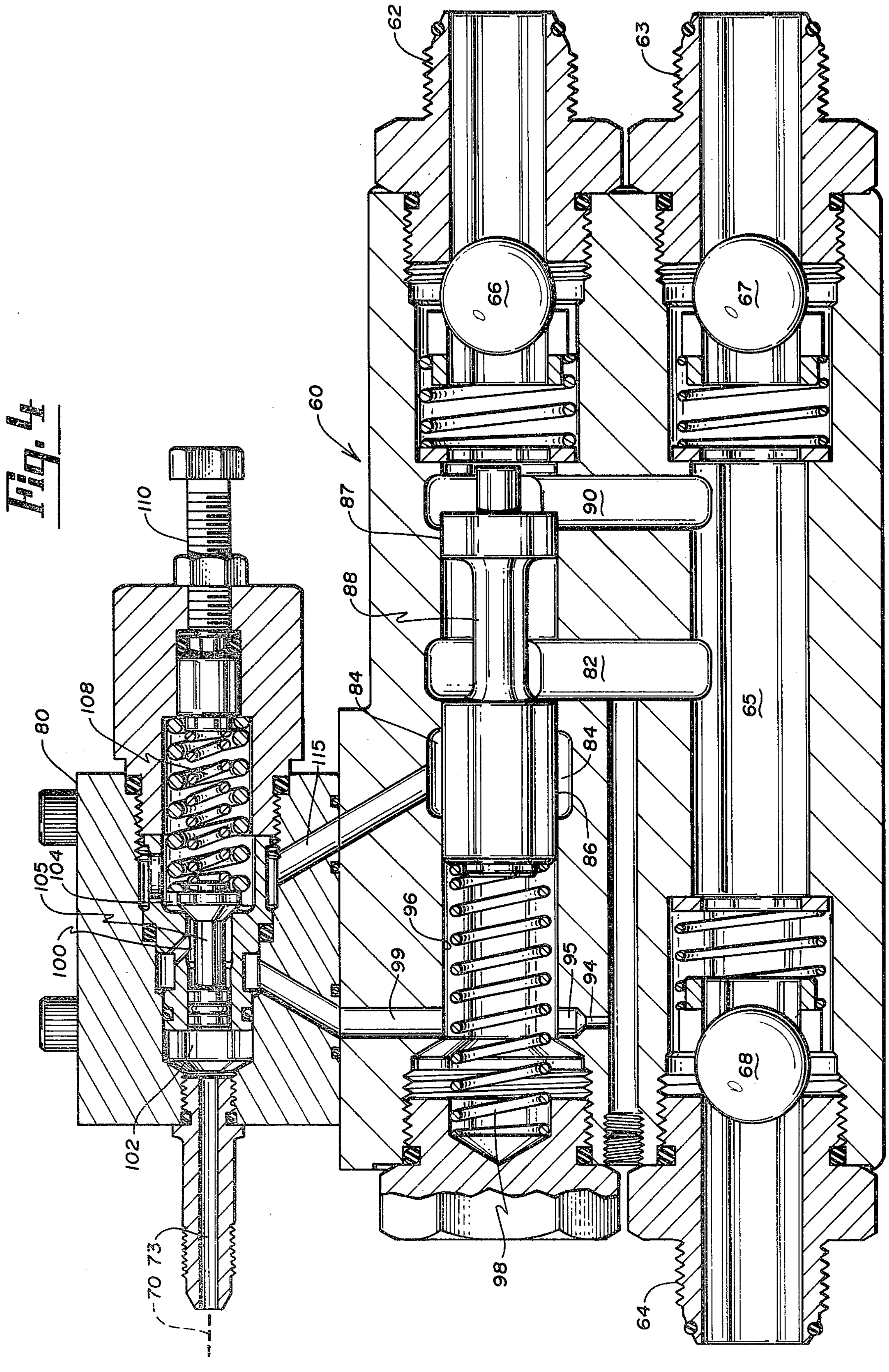

The details of the overload protection device will be seen in FIG. 4. It includes the manifold 65 or housing having a central bore therein with ports connecting to fluid lines 62, 63 and 64 representing the lines from the forward power sides of actuators 20, 30 and 40. Included in the body of the manifold are the check valves 66, 67 and 68 for the fluid lines 62, 63 and 64 respectively.

Also mounted on the manifold is the pilot valve 80 which receives control pressure from the pilot line 70 through a port indicated at 73.

Within the body of the manifold is a passage 82 leading to a port 84 which is connected to the reservoir 55. A first pressure control valve comprised of a longitudinally shiftable dumping valve or spool having lands 86, 87 at the ends of the same with a grooved section 88 in between, controls flow through the passage 82 to the dump port 84.

A second passage 90 formed in the common manifold 65 leads to one end of the spool valve or against the end surface of land 87 of the spool. Leading from the passage 82 is a restriction passage 94 which connects via passage 95 with a pressure chamber 96 which is located behind the land 86 of the spool valve. A bias spring 98 is positioned within the pressure chamber 96 and bears against the end surface of the land 86.

The pressure chamber 96 is connected by a passage 99 to a chamber 100 of the pilot valve 80. This pilot valve 80 includes a spool having lands 102, 104 with a groove 105 therebetween, the land 104 having a seal surface as shown which normally prevents flow between chamber 100 and passage 115. A spring mechanism 108 with an adjustment mechanism 110 bears against land 104 to adjust the trip pressure of the pilot valve.

The sensing pressure is applied against the face of the land 102 from the pilot line 70. Whenever the pressure in the pilot line 70 exceeds a predetermined pressure, the spool will shift axially from containing position to dumping position against the spring mechanism so that land 104 with its seal surface will move to the right as shown in FIG. 4, and bring chamber 100 into communication with passage 115 which leads to the reservoir port 84 in the manifold. This opening of chamber 100 to passage 115 will thereby allow pressure in the chamber 96 to drop due to fluid passing through passages 99 and 115 and chamber 100 to the reservoir.

Under normal circumstances, the first pressure control valve will be biased to a position where the passage 82 to the port 84 will be closed. Both ends of the spool or the lands 86, 87, will have manifold pressure applied to the ends of the same in opposite directions. The chamber 96 also has the spring 98 therein which bears against the end of land 86 and unbalances these pressures on the spool normally causing it to stay in a position where passage 82 is closed to port 84.

Thus, whenever the pilot valve 80 is operated due to the presence of a pressure in pilot line 70, which exceeds that for which the adjustment mechanism 110 is set, it will cause a drop in pressure in chamber 96. This occurs with operation of the pilot valve which opens passage 99 from chamber 96 through chamber 100 in the pilot valve to passage 115 and port 84 leading to the reservoir. The pressure in chamber 96 which is connected to the manifold through the restriction 94 and passage 95, does not remain equal to the existing manifold pressure upon operation of the pilot valve since the restriction prohibits rapid flow from the manifold. Therefore, the pressure in chamber 96 remains low as compared to that bearing against land 87, and the force of the spring 98 is overcome by this pressure differential, causing the spool to move from containing position against the force of the spring to open passage 82 to port 84. The port 84 is connected to the reservoir 55 and hence when this occurs, the spool or dumping valve is in dumping position and the fluid in the manifold and the lines connected thereto flows to the reservoir. This dumps the power lines of the actuators 20, 30 and 40 to the reservoir, interrupting operation of these motors until the overstress condition causing the excessive pressure on the power side of the lift cylinder 15 is corrected.

The pilot valve 80 remain in the open position described avove as along as the high pressure from the lift cylinder or cylinders exist. The operator will then reverse the function of the motors 20 and 30 because of their normal holding devices, and, if necessary, motor 40 to relieve the overstress condition, at which time the pressure on the power side of the cylinder 15 will reduce, allowing the pilot valve 80 to close. A gradual buildup in pressure in chamber 96 via passage 94 will move the spool of the normally closed control valve back to its normal position, thereby closing the passage 82 from the manifold to the reservoir. This will again make full power available to each of the motors 20, 30 or 40.

With this improved overstress or overload protection device, the presence of the overpressure condition is monitored by the pilot line to the overstress valve. With an increase in pressure on the pilot valve, due to an overload condition, the overstress valve is unloaded, causing the manifold fluid to be dumped to the reservoir and equipment operation interrupted until the lift cylinder pressure is reduced to a normal pressure. Normal pressure in the lift cylinder is again achieved by eliminating the cause of the overpressure condition, that is, either retracting the extension cylinder, reversing the winch or reversing the auger.

This overload protection apparatus is suitable for any application where the various fluid operating equipment units shares pressure and return lines. It is particularly applicable where functional operation of the equipment is interrelated exposing certain elements of the equipment to the overload condition. The overstress or overload valve can detect the condition immediately by the pressure build in the lift cylinder and interrupt operation of the equipment without hazard to the operator or damage to the equipment.

In considering this invention, it should be remembered that the present disclosure is illustrative only and the scope of the invention should be determined by the appended claims.

What I claim is:

1. Overload protection apparatus for interrelated hydraulic multi-function equipment comprising:

(a) a plurality of bi-directional motors each having a pair of fluid power lines including a forward and a reverse line connected thereto and an associated control valve interposed within each pair of said lines for selectively controlling the direction of the operation of said motors;

(b) one of said motors being interconnected with each of the others in such a way that an increase in the load of one of said others will create a corresponding increase in the load of said one motor;

(c) a source of fluid power connected to each of said valves to supply hydraulic fluid to said motors through said lines;

(d) each of said motors having a fluid supply reservoir to which it is connected to receive the return of fluid therefrom;

(e) an overload protection device including a manifold connected to the forward power lines of said other motors;

(f) said manifold having a passage therein connected to a reservoir and to each of said forward power lines of said other motors;

(g) a dumping valve interposed within said passage and normally closing off the same but being shiftable between containing and dumping positions to simultaneously bring each of said forward power lines into communication with its associated reservoir; and, (h) a sensor valve connected to said one motor and being operationally sensitive to an overload fluid pressure of predetermined magnitude therewithin;

(i) said sensor valve being controllably connected to said dumping valve and causing the same to shift to dumping position when said sensor valve is operated by such an overload fluid pressure within said one motor;

(j) said dumping valve being a pressure actuated spool valve positioned in said manifold and having pressure chambers at each end of the spool, one of said pressure chambers being exposed to the manifold directly and the other of said chambers being exposed to the manifold through a restriction, said latter pressure chamber including a bias spring bearing against the spool, and said spool having a recess therein which upon displacement of the spool aligns with a port to connect the passage in the manifold with the reservoir.

2. The overload protection apparatus of claim 1 in which the forward power lines between said other motors and said manifold include check valves in said manifold.

3. The overload protection apparatus of claim 1 in which the sensor valve is a pressure operated valve which upon the presence of said predetermined overload high pressure opens a passage from said other pressure chamber behind the spool of the dumping valve to cause displacement of said spool to connect the manifold to the reservoir.

4. The overload protection apparatus of claim 1 in which said one of said motors has a hold valve connected between said control valve and said forward power line of said one of said motors.

5. The overload protection apparatus of claim 1 in which certain of said motors are rotary hydraulic motors and other of said motors are bidirectional linear hydraulic actuators with said one of said motors being so positioned on said multi-function equipment so as to reflect a load on any of said motors.

6. The overload protection apparatus of claim 1 in which the multi-function equipment is a digger derrick with a winch and auger thereon and in which said one of said motors connected to said pilot valve is the lift cylinder for said derrick.

7. The overload protection apparatus of claim 1 in which the sensor valve is mounted on the overload protection device and communicates with the passage in the manifold to the reservoir.

8. The overload protection apparatus of claim 1 in which said one of said motors is a pair of actuators and the sensor valve controlling operation of the dumping valve in the overload protection device is connected to the forward power lines for said actuators.

9. The overload protection apparatus of claim 4 in which the reverse fluid lines of said one of said motors is connected to the holding valve to release said holding valve when the pressure in said forward power line of said one of said motors is less than the pressure in the said reverse fluid line for said one of said motors.

* * * * *